Nov. 24, 1925.  M. SCHLING  1,562,992
FLOWER HOLDER
Filed April 29, 1925
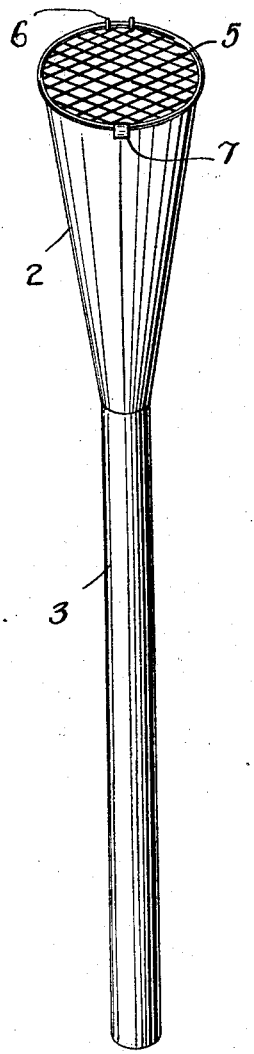
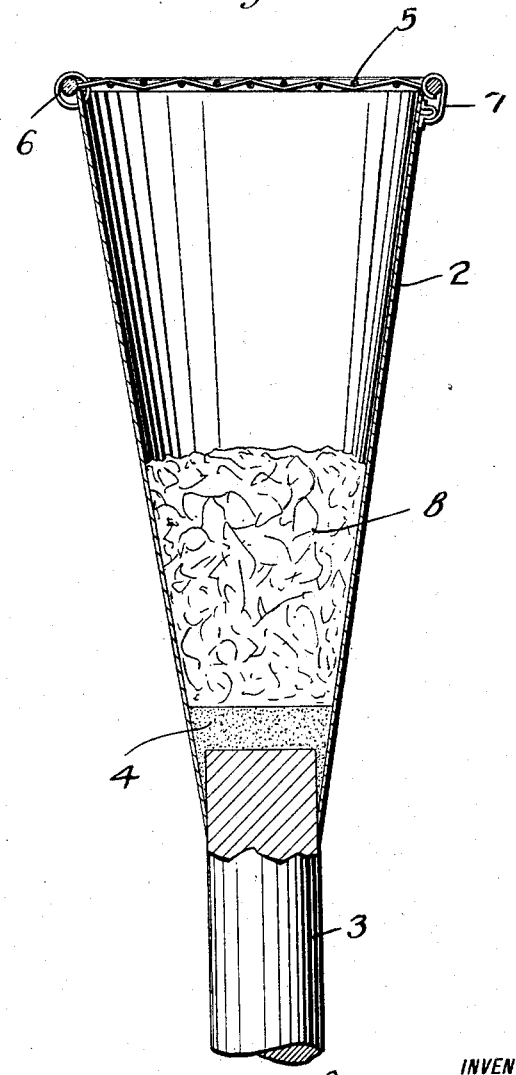
INVENTOR
Max Schling
BY
Clarence G. Galston
ATTORNEY Patented Nov. 24, 1925.

1,562,992

UNITED STATES PATENT OFFICE.

MAX SCHLING, OF NEW YORK, N. Y.

FLOWER HOLDER.

Application filed April 29, 1925. Serial No. 26,609.

*To all whom it may concern:*

Be it known that I, MAX SCHLING, a citizen of the United States, residing at 785 Fifth Avenue, in the city and county of New York and State of New York, have invented a new and useful Flower Holder, of which the following is a specification.

The object of this invention is to provide a device for presentation of flowers at theaters, concerts and the like, which shall be convenient to handle and effective for display and in which flowers shall keep for a much longer time than is ordinarily possible with these display bouquets.

In the accompanying drawings, forming part hereof:

Fig. 1 is a perspective view of the device; and

Fig. 2 is a longitudinal section on a larger scale through the upper portion of the device.

The device comprises a deep, tapering cup 2 on the upper end of a stick or handle 3. The upper end of the handle enters the lower, narrow end of the cup, as seen in Fig. 2, and a mass of cement 4 is introduced into the bottom of the cup and allowed to harden around the end of the stick, making a solid, tight joint.

Over the mouth of the cup is a guard 5 of mesh form, providing numerous openings for the insertion of the stems of flowers. This guard is connected to the cup at one side by a hinge 6, and is adapted to be held closed by a catch 7 at the other side. The interior of the cup is partly filled with moss 8 adapted to hold moisture, and the stems of the flowers passed through the guard are stuck into this moss, which keeps them fresh for a long time.

What is claimed as new is:

A device for presentation of flowers comprising a tapering cup adapted to receive moss, a handle comprising a stick the upper end of which enters the narrow lower end of the cup, a hardened plastic mass in the lower end of the cup enclosing the upper end of the stick, and a guard for the top of the cup provided with openings for flower stems.

MAX SCHLING.